2,900,268

PROCESS FOR PREPARING HYDROXY-ALKYLATED CEREAL FLOUR

John C. Rankin and Charles L. Mehltretter, Peoria, Ill., assignors to the United States of America as represented by the Secretary of Agriculture No Drawing. Application November 15, 1956
Serial No. 622,506

10 Claims. (Cl. 106—150)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the production of novel chemical derivatives of cereal flour. More particularly, the invention concerns the production of hydroxyalkylated cereal flour by the reaction of an alkylene oxide with a cereal flour.

The specific object of the invention is the provision of novel processes for the production of hydroxyalkylated cereal flour under conditions wherein the flour material and the product of the reaction are maintained in the same dry physical form as that of the original flour throughout each stage of the process.

Another object of the invention concerns the provision of processes for preparing hydroxyalkylated cereal flour which contains all the original components of the original flour, that is, neither protein nor starch components of the flour are lost during the process.

A further object is to provide methods for chemically modifying cereal flour by hydroxyalkylation to produce water-dispersible products which form dispersions that do not gel, retrograde, nor "set-back," and which display uniform viscosity, a low gelatinization temperature for the modified starch component thereof, good spreadability and high degree of penetration.

Further objects and advantages of the invention will be evident from the following description.

It is well recognized in industry that there is a continuing demand for substances which may be termed pasting agents or thickeners. Modern specifications require that these agents be readily dispersible in water, that the resulting dispersions be stable, i.e., free from any tendency to gel on standing, that the material form a thick paste in relatively dilute dispersion, etc. Materials of this kind are widely used for sizing paper and textiles, as adhesives in bookbinding and stamp and gummed envelope manufacture and almost innumerable other applications. It is also known that hydroxyalkylated starch made by reacting starch with an alkylene oxide, usually ethylene oxide, meets most of these specifications and is well suited to many industrial uses.

The disadvantage of preparing such useful agents from starch lies in the fact that the starch must first be separated from the cereal material in which it naturally occurs and then subjected to the hydroxyalkylation process. The separation may be done by various techniques. For example, in obtaining starch from wheat, the cereal is first milled to separate the endosperm which is then ground into a flour. This flour is then subjected to treatment, as by the "batter" process, to separate the flour into its components—starch and protein (specifically gluten in the case of wheat). The separated starch is then processed by known methods to make the hydroxyalkyl starch. It must be emphasized at this point that starch never occurs in a free state in nature, it is invariably associated with proteins and hence the preparation of hydroxyalkyl starch invariably requires as a prelude its isolation from naturally occurring protein.

It has now been found that pasting agents which possess all the desirable attributes required by current standards can be made directly from cereal flours, that is, without any necessity for separation of the starch and protein components of the flour. Briefly described this is accomplished simply and expeditiously by reacting the cereal flour with an alkylene oxide. The reaction causes chemical combination between the alkylene oxide and both the starch and protein compounds of the flour. Thus the product contains hydroxylalkylated protein in addition to hydroxyalkylated starch.

The hydroxyalkylated cereal flours in accordance with the invention are free-flowing powders which are readily dispersible in water forming dispersions which are stable having little tendency to gel, retrograde, or form "setbacks." In addition the dispersions display uniform viscosity, a low gelatinization temperature for the modified starch portion of the product, good spreadability and ease of penetration in the application of the products. Also the products and water dispersions are not subject to molding; pastes of the product may be subjected to moist atmospheric conditions for extended periods of time without microbial attack. Further properties are set forth in detail hereinafter.

The hydroxyalkylated cereal flours of the invention are useful for many purposes. For instance, they may be employed for sizing of paper, textiles, cordage, etc., for gumming stamps, envelopes and similar paper products, as adhesives in box manufacture, bookbinding, bag making, etc., in preparation of textile printing pastes, for textile stiffening agents in laundries, etc.

As noted briefly above, the products of the invention are prepared by reacting an alkylene oxide with the cereal flour. More specifically, the technique involves contacting the alkylene oxide with the cereal flour in its dry state in the absence of any dispersion medium. The term "dry" as used herein is not meant to imply an absolute anhydrous state but that the flour contains only its usual and normal content of moisture, usually 10 to 15 percent. Conducting the reaction under such circumstances brings about several significant and practical advantages. In the first place it prevents loss of valuable constituents by leaching action and secondly it simplifies the process in that no evaporation, drying, or other manipulation techniques to remove added water are involved. These advantages will be explained further in connection with the following discussion of the prior art.

In general, prior procedures involve forming the protein or starch into a dispersion with alkali and water or other solvent and then introducing the alkylene oxide into the dispersion. Such procedures suffer from the disadvantage that the hydroxyalkyl compound must then be isolated from the dispersion. This, of course, is always cumbersome to do because of the pastiness of the dispersions and it involves substantial expense for filtrations or centrifugation, evaporation, and re-grinding of the product after drying. It has been more recently shown (U.S. Patents Nos. 2,516,632, 2,516,633, and 2,516,634) that starch may be hydroxyalkylated in granule form. This is done by dissolving a catalyst (sodium hydroxide, sodium chloride, or a mixture of both) in an aqueous suspension of starch. The suspension is then filtered and the separated starch containing occluded catalyst dried and reacted with ethylene oxide. The catalyst is conveniently added to the starch suspension which is formed as a standard step in the separation of starch from flour. This procedure, though expedient in the case of starch would be disadvantageous in the treatment of flour. This situation is explained as follows: In the first place, if a cereal flour is mixed with water or other solvent containing the catalyst with the aim of dispersing the catalyst into the flour, a paste of such sticky consistency is formed that uniform mixing is virtually impossible. Secondly, removal of the water from the resulting dispersion is very difficult to accomplish because of the sticky nature of the material. The most important drawback to the procedure is that the added water will leach out of the flour soluble protein constituents whereby these constituents will be lost. This results in an inability to hydroxyalkylate the whole composition of the flour.

According to this invention the above disadvantages are completely avoided by elimination of the use of any liquid dispersion medium. That is, a dry, solid catalyst is incorporated into the dry cereal flour and the resulting composition in this dry form is reacted with the alkylene oxide. These results are surprising since it is generally believed in the prior art that hydroxyalkylation of various organic compounds, particularly proteins, requires for the protein to be in a dispersed state. In the process of the invention, it is necessary to add to the flour a minor amount of a catalyst for the hydroxyalkylation reaction. The catalyst may be a water-soluble alkali such as sodium hydroxide, potassium hydroxide, the carbonates or bicarbonates of sodium or potassium, etc. One may also use mixtures of an alkali with a water-soluble salt of an alkali metal or alkaline earth metal such as sodium chloride, potassium chloride, calcium chloride, sodium sulfate, potassium sulfate, etc. Such salts are commonly referred to in the art as latent alkaline catalysts since during the hydroxyalkylation they liberate alkali. In order to uniformly incorporate the catalyst into the cereal flour, the former in dry powdered form is thoroughly mixed into the dry cereal flour prior to contacting with the alkylene oxide. No water or other dispersion medium is used; the dry ingredients are blended in such state.

Although the process of the invention is operative to produce hydroxyalkyl derivatives over a wide range of catalyst proportions, it has been found that to get high quality products of optimum paste clarity, the proportion of catalyst must be controlled within certain limits. Thus it is preferred to employ an amount of alkali in the range from 2 to 5 percent. Where the concentration of alkali is higher than 5 percent, alkali has a tendency to swell or gelatinize the starch portion of the flour unless the reaction is run at reduced temperature, that is, below room temperature. Such swelling during the reaction is undesirable because the particles of flour stick together in clumps destroying the free-flowing qualities thereof and producing a product of non-uniform quality. Where the concentration of alkali is less than 2 percent, the products when formed into pastes have inferior clarity. As noted above, salts may be used in admixture with alkalis, however in any case it is preferred that there be present at least 2 percent alkali. The amount of salt can then vary from 0 up to 3 or 5 percent.

Another important aspect of the invention lies in the step of aging the dry cereal flour after addition of dry catalyst. It has been found that if the mixture of cereal and catalyst is permitted to stand in the dry state for a substantial period of time, the products formed upon subsequent hydroxyalkylation will exhibit particularly clear pastes. The influence of aging is demonstrated below in Example VI. The aging is carried out by simply storing the cereal-catalyst at about room temperature for a period of about 1 day to 10 days. Usually an aging for 2 to 3 days gives good results and further aging imparts little, if any, further improvement. During the aging the material is kept in a closed container and may be kept under an atmosphere of an inert gas such as nitrogen to minimize any side reactions such as oxidation or degradation of the starchy portion of the flour.

Whenever reference is made to an alkylene oxide herein it is intended to encompass the aliphatic compounds which contain an oxygen atom linked to two adjacent carbon atoms, as illustrated by the structural formula

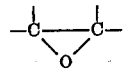

In general, ethylene oxide is the preferred embodiment of the alkylene oxide. Another typical example of an alkylene oxide which can be employed is propylene oxide. In some cases useful products can be prepared by using such alkylene oxides as 1,2-epoxy-3-butene, glycidol, and the like.

The amount of alkylene oxide chemically incorporated into the flour can be varied over a wide range, for example from as low as 1 percent to as high as 20 percent, thus to produce products of correspondingly varying properties. In most cases it is preferred to react the flour with about 10 to 15 percent of alkylene oxide to impart optimum properties as desired for sizing and adhesive applications. It has been observed, however, that products containing as low as 3 percent ethylene oxide form pastes of greatly reduced gelling and retrograding properties as compared with the pastes from the original flour.

In the step of reacting the alkylene oxide with the dry flour containing added dry catalyst, it is necessary to control the conditions so that the flour is maintained as a free-flowing powder. The reaction should not be allowed to become so vigorous as to cause swelling or gelatinization of the starchy portion of the flour. If this occurs, a non-uniform jelly-like mass of no practical utility is produced. Since the rate of reaction is increased by increase in reaction temperature and by increase in alkali concentration, proper control of the reaction to maintain the flour in its free-flowing powder form involves a correlation of the temperature and alkali concentration. In general, the reaction is conducted at a temperature from about 25° to about 75° C. The temperatures at the low end of this range are used when the proportion of alkali is high, and conversely when lower proportions of alkali are used the temperatures at the higher end of the range are used. As an example, when the reaction is conducted at 25 to 45° C. the proportion of alkali is about 5 percent; when the reaction is conducted at 45–60° C. the proportion of alkali is about 2.5 percent. The pressure at which the alkylene oxide is reacted with the flour may be varied from superatmospheric to subatmospheric. Although it is preferred to carry out the process at atmospheric or subatmospheric pressure, successful hydroxyalkylation of flour has also been accomplished at 10 to 15 pounds per square inch. It is usually preferable to add the alkylene oxide to the flour gradually or in small increments to avoid any danger of explosion or local overheating of flour particles. It is evident that thorough mixing during reaction is preferred to enable uniform contact between the flour particles and the alkylene oxide. In this respect it is to be noted that by preserving the flour in a free-flowing powder form throughout the reaction, such uniform contact is easily achieved.

With the use of sodium hydroxide as a catalyst for the reaction, the pH of a water paste of hydroxyalkyl flour products are usually around 10.5. The alkalinity may be reduced by treating the dry product in the reaction vessel with either gaseous $CO_2$ (final pH 9.7 of pastes) or with a powder of some solid acid such as boric acid (final pH 8.8 of pastes). However, if less basic salts such as the carbonates are used for hydroxyalkylation of cereal flour the pH of final products fall within the latter pH range.

The process of this invention is applicable to all forms of cereal flour, such as, the flours of wheat, corn, rye, barley, rice, and so forth. The various grades and individual varieties of these flours are also included.

Depending on the source of the cereal, it may contain from about 65 percent starch and 20 percent protein in the case of hard wheat flour to about 93 percent starch and 6 percent protein in the case of rice and corn flours.

Typical composition of various cereal flours are set forth below.

TYPICAL COMPOSITION OF FLOURS

| Flour | Percent Starch | Percent Protein |
|---|---|---|
| Wheat | 65-88 | 8-21 |
| Corn | 84-89 | 7-8 |
| Rye | 75-87 | 10-20 |
| Barley | 71-79 | 10-15 |
| Rice | 68-93 | 6-12 |

The invention is further demonstrated by the following examples which are offered only by way of illustration, not limitation.

Example I

Dry commercial wheat flour (moisture content 13 percent) was mixed thoroughly with 2.5 percent by weight of dry, powdered sodium hydroxide. The material was sealed under an atmosphere of nitrogen and stored at room temperature for 4 days.

The aged material was then placed in a pressure-tight vessel provided with means for agitation and heating. The vessel was also provided with a combination vacuum-pressure gauge. After evacuating the vessel to a 28 inch vacuum, gaseous ethylene oxide was admitted to the reaction chamber until the pressure therein reached atmospheric pressure. Additional amount of ethylene oxide were added at intervals when the pressure dropped due to absorption of ethylene oxide by the flour. A total of 14 percent by weight of ethylene oxide was introduced over a period of 6½ hours. During this reaction period, the reactants were maintained at 50° C. and kept under constant agitation. The product was then removed from the reaction vessel and was noted to be a finely-divided free-flowing powder much like the original flour in appearance. The product, obtained in a yield of 96 percent, contained about 9 percent moisture and formed a clear, smooth viscid paste with water which paste did not retrograde or gel on standing. Further data on the properties of the product are set forth hereinbelow.

Example II

Dry commercial wheat flour (moisture content 13 percent) was mixed thoroughly with 2.5 percent by weight of dry, powdered sodium hydroxide. The mixture was sealed under an atmosphere of nitrogen and stored at room temperature for 6 days.

The aged mixture was then reacted with ethylene oxide as set forth in Example I with the following differences. A pressure between 5 and 15 pounds per square inch was maintained in the system by diluting the ethylene oxide with nitrogen gas. The reaction was run at 25° C. for 7 hours until 3 percent by weight of ethylene oxide had been taken up by the flour. The product in a yield of 100 percent was similar in appearance and properties to that of Example I. Further properties of the product are set forth below.

Example III

The process of Example I and II were repeated except that, in these cases, the amount of ethylene oxide added to the flour was varied as follows:

| Product | Yield, percent | Content of ethylene oxide, percent | Moisture, percent |
|---|---|---|---|
| IIIa | 97 | 6 | 11.5 |
| IIIb | 97 | 10 | 10.6 |
| IIIc | 95 | 15 | 9.6 |

Example IV

In order to evaluate the products as described above, pastes were prepared and subjected to various standard tests. The results are tabulated below:

TABLE I.—PROPERTIES OF HYDROXYETHYLATED WHEAT FLOUR

| Sample | $C_2H_4O$ content, percent | Clarity, percent transmission | | Percent swollen granules | |
|---|---|---|---|---|---|
| | | 1% paste | 5% paste | 1% paste | 5% paste |
| Wheat flour (control) | zero | 12 | 3 | 8.8 | 60 |
| Hydroxyethyl wheat flour | 3 | 66 | 9 | 18 | 100 |
| Do | 6 | 68 | 45 | 30 | 100 |
| Do | 14 | 78 | 50 | 35 | 100 |

It was also observed that pasted solutions of wheat flour form a gel and retrograde within the first day, whereas, hydroxyethyl wheat flour products remain stable in their pasted solutions for months.

The above data is based on procedure carried out as follows:

Weighed samples of the hydroxyethyl wheat flour products were dispersed in a known volume of water contained in appropriate test tubes. The mixtures were cooked 30 minutes with stirring in a boiling water bath (92–100° C.). Samples were cooled for 1 hour in running tap water, the volume of water loss was adjusted when necessary, and then the pastes were stored for 24 hours at 8° C.

Paste clarity was measured with the use of a Coleman spectrophotometer and clarity is reported as percent transmission of light at 650 m$\mu$. Water is used as the standard for 100 percent transmission of light. In the figures set forth above, a higher percent of transmission is, of course, an index of greater clarity.

Farley and Hixon's swollen granules test (Ind. and Eng. Chem., 34, 677 (1942)), was used as an indication of paste viscosity.

Example V

Uniform viscosity and low surface tension are highly desirable properties of pastes in application as adhesives and sizings. To test spreadability and penetrability, surface tension and viscosity measurements were made on the water pastes of our products. A Cenco-du Noüy interfacial tensiometer was used for surface tension measurements and a Corn Industries viscosimeter was used for viscosity measurements. The following results were obtained:

TABLE II.—SURFACE TENSION MEASUREMENTS OF HYDROXYETHYL FLOUR PRODUCTS AT 25° C.

| $C_2H_4O$ content, percent | 1% paste, dynes per cm. | 5% paste, dynes per cm. |
|---|---|---|
| 13 | 40.7 | 43.2 |
| 14 | 40.3 | 40.1 |

The lowering of the surface tension of water (72 dynes per cm. at 25° C.) by hydroxyethyl wheat flours places the pastes of these products in the same group with common non-ionic surface active agents.

Viscosity measurements were made for 30 minutes with a propeller speed of 60 revolutions per minute and a final temperature of 89° C. for the pastes.

| Sample | $C_2H_4O$ content, percent | Concentrate of paste, percent | Maximum viscosity, g. cm. | Minimum viscosity, g. cm. |
|---|---|---|---|---|
| Wheat flour | zero | 5 | 0 | 0 |
| Do | zero | 8 | 105 | 30 |
| Hydroxyethyl wheat flour | 16 | 5 | 36 | 36 |
| Do | 16 | 8 | 211 | 108 |

For an 8 percent paste of hydroxyethyl flour a maximum viscosity was reached in 3 minutes (62° C.), and a minimum viscosity in 13 minutes (84° C.) which remained the same for the rest of the 30 minutes testing period. In contrast wheat flour (8 percent paste) reached a maximum in 10 minutes (81° C.) and never achieved a uniform viscosity having its minimum viscosity at the end of the test.

*Example VI*

The following experimental data illustrates the influence of aging prior to reaction with ethylene oxide.

In these experiments, dry commercial wheat flour was mixed with 2.5 percent dry, powdered sodium hydroxide. Part of the material was stored for 4 days before reacting with ethylene oxide, the other part was directly reacted with the ethylene oxide. In both cases the ethylene oxide was reacted with the dry flour plus dry catalyst. The following results were obtained:

| Sample | Treatment | $C_2H_4O$ content, percent | Clarity, percent transmission | | Percent swollen granules | |
|---|---|---|---|---|---|---|
| | | | 1% paste | 5% paste | 1% paste | 5% paste |
| A | Aged | 10 | 70 | 40 | 31 | 100 |
| B | Not aged | 16 | 36 | 11 | 23 | 100 |

It is evident from the above that the product from the aged material gave a much clearer paste than that from the non-aged material.

*Example VII*

The following experiments illustrate the influence of concentration of alkali catalyst.

In these tests samples of dry commercial wheat flour were mixed with various proportions of dry sodium hydroxide (in one case dry sodium chloride was also added). The mixtures were aged for at least 3 days, then the dry flour plus dry catalyst was reacted with ethylene oxide as described above. The results are set forth below:

| Sample | Content of $C_2H_4O$, percent | Catalyst | Clarity of paste, percent transmission | | Percent swollen granules | |
|---|---|---|---|---|---|---|
| | | | 1% paste | 5% paste | 1% paste | 5% paste |
| A | 15 | 1% NaOH | 33 | 6 | 24 | 95 |
| B | 14 | 0.2% NaOH +5% NaCl | 21 | 5 | 14 | 65 |
| C | 10 | 2.5% NaOH | 70 | 40 | 31 | 100 |
| D | 17 | 5% NaOH | 73 | 34 | 25 | 100 |

It is evident from the above data that the products made with 2.5 and 5 percent NaOH catalyst (C and D) gave much clearer pastes than did the other two samples using 1 percent NaOH (A) or 0.2 percent NaOH and 5 percent NaCl (B). The results also show that little is gained as to clarity of pastes using the highest concentration of alkali (5 percent).

COMPARATIVE TEST

It has been explained above that a feature of this invention is that it is carried out on dry materials without the use of any dispersion medium. The following experiments illustrate the inferior results achieved when a dispersing medium (water) is added to the system.

In the first experiment, the sodium hydroxide catalyst in the form of aqueous solution was added to wheat flour. The amount of water was such as to produce a moist powder. On subjecting this material to reaction with ethylene oxide it was found that a swollen, jelly-like mass was obtained. This material could not be used in such condition nor could it be dried directly without forming a horny, non-dispersible mass. Thus to isolate it in a better physical form it was suspended in water and precipitated with acetone. The precipitate was then dried.

In the second experiment, dry wheat flour was admixed with dry sodium hydroxide and reacted with ethylene oxide as above described.

The results obtained are set forth below. The data demonstrates the low yield and low protein content of the first experiment due to loss of protein by solution during the isolation step necessary to recover this product in a usable form.

| No. | $C_2H_4O$ content, percent | Protein content, percent | Yield of product, percent |
|---|---|---|---|
| 1 | 12 | 5.7 | 79 |
| 2 | 15 | 13.4 | 95 |

Having thus described our invention, we claim:

1. A process for preparing hydroxyalkylated cereal flour which comprises admixing dry cereal flour with about 2 to 5 percent of a dry alkaline catalyst, mixing the dry mixture with an alkylene oxide in a reaction system free from any liquid dispersing medium, permitting the dry mixture of cereal flour and alkaline catalyst to remain in contact with said alkylene oxide until said cereal flour has been hydroxyalkylated, and recovering the hydroxyalkylated cereal flour as a free-flowing powder.

2. The process of claim 1 wherein the alkylene oxide is ethylene oxide.

3. The process of claim 1 wherein the alkylene oxide is ethylene oxide and the alkaline catalyst is sodium hydroxide.

4. A process for preparing hydroxyalkylated cereal flour which comprises admixing a dry cereal flour with about 2 to 5 percent of a dry alkaline catalyst, aging the dry mixture for a period of from about 1–3 days, mixing the aged, dry mixture with an alkylene oxide in a reaction system free fom any liquid dispersing medium, permitting the dry mixture of cereal flour and alkaline catalyst to remain in contact with said alkylene oxide until said cereal flour has been hydroxyalkylated, and recovering the hydroxyalkylated flour as a free-flowing powder.

5. The process of claim 4 wherein the alkylene oxide is ethylene oxide.

6. The process of claim 4 wherein the alkylene oxide is ethylene oxide and the alkaline catalyst is sodium hydroxide.

7. A process for preparing hydroxyalkylated wheat flour which comprises admixing dry wheat flour with about 2 to 5 percent of a dry alkaline catalyst, thereafter mixing the dry mixture with from 1 to 20% of an alkylene oxide in a reaction system free from any liquid dispersing medium, permitting the dry mixture of wheat flour and alkaline catalyst to remain in contact with said alkylene oxide until said wheat flour has been hydroxyalkylated, and recovering the hydroxyalkylated wheat flour as a free-flowing powder.

8. A process for preparing hydroxyalkylated wheat flour which comprises admixing dry wheat flour with about from 2 to 5 percent of a dry alkaline catalyst, aging the dry mixture for a period of from about 1 to 3 days, mixing the aged, dry mixture with from about 1 to 20 percent of an alkylene oxide in a reaction system free from any liquid dispersing medium, permitting the dry mixture of wheat flour alkaline catalyst to remain in contact with said alkylene oxide until said wheat flour has been hydroxyalkylated, and recovering the hydroxyalkylated wheat flour as a free-flowing powder.

9. A process for preparing hydroxyethylated wheat flour which comprises admixing dry wheat flour with about 2 to 5 percent of dry sodium hydroxide, thereafter mixing the dry mixture with from 1 to 20% of ethylene oxide in a reaction system free from any liquid dispersing medium, permitting the dry mixture of wheat flour and sodium hydroxide to remain in contact with said ethylene oxide until said wheat flour has been hydroxyethylated, and recovering the hydroxyethylated wheat flour as a free-flowing powder.

10. A process for preparing hydroxyethylated wheat flour which comprises admixing a dry wheat flour with about from 2 to 5 percent of dry sodium hydroxide, aging the dry mixture for a period of from about 1 to 3 days, mixing the aged, dry mixture with from about 1 to 20 percent of ethylene oxide in a reaction system free from any liquid dispersing medium, permitting the dry mixture of wheat flour and sodium hydroxide to remain in contact with said ethylene oxide until said wheat flour has been hydroxyethylated, and recovering the hydroxyethylated wheat flour as a free-flowing powder.

References Cited in the file of this patent

UNITED STATES PATENTS 2,733,238     Kerr et al. _____ Jan. 31, 1956

FOREIGN PATENTS 741,742     Great Britain _____ Dec. 14, 1955